US010857748B2

(12) United States Patent
Astier et al.

(10) Patent No.: US 10,857,748 B2
(45) Date of Patent: Dec. 8, 2020

(54) PRESSURE BONDING PRODUCTS IN THE MANUFACTURE OF TIRES

(71) Applicant: COMPAGNIE GENERALE DES ETABLISSEMENTS MICHELIN, Clermont-Ferrand (FR)

(72) Inventors: Cedric Astier, Clermont-Ferrand (FR); Henri-Alexandre Oursaire, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 251 days.

(21) Appl. No.: 16/098,647

(22) PCT Filed: Apr. 25, 2017

(86) PCT No.: PCT/EP2017/059798
§ 371 (c)(1),
(2) Date: Nov. 2, 2018

(87) PCT Pub. No.: WO2017/190987
PCT Pub. Date: Nov. 9, 2017

(65) Prior Publication Data
US 2019/0143621 A1     May 16, 2019

(30) Foreign Application Priority Data

May 3, 2016   (FR) .................................... 16 53996

(51) Int. Cl.
*B29D 30/28*        (2006.01)
(52) U.S. Cl.
CPC .................................. *B29D 30/28* (2013.01)

(58) Field of Classification Search
CPC ........ B29D 30/28; B29D 30/14; B29D 30/16; B29D 2030/0621; B29D 2030/0625;
(Continued)

(56) References Cited

U.S. PATENT DOCUMENTS

| 5,257,965 A | 11/1993 | Fuchs et al. |
| 2008/0000576 A1 | 1/2008 | Miller et al. |
| 2016/0361883 A1 | 12/2016 | Pulici et al. |

FOREIGN PATENT DOCUMENTS

| DE | 2806973 A1 | 8/1979 |
| WO | 2015087289 A2 | 6/2015 |

OTHER PUBLICATIONS

International Search Report dated Aug. 9, 2017, in corresponding PCT/EP2017/059798 (2 pages).

*Primary Examiner* — Robert C Dye
*Assistant Examiner* — Alexander D Booth
(74) *Attorney, Agent, or Firm* — Venable LLP (57) ABSTRACT

A tire production device is provided for pressure bonding products that are presented in a product profile (120) on a forming drum surface. The device includes a multidisc roller system (100) having a frame (102) relative to which a plurality of disc assemblies (104, 104') are disposed along a common axis. Each disc assembly includes an actuatable arm 106 that is linearly displaceable relative to the frame, a pair of removably attached demi-discs (110, 110') and a bearing (112) that accommodates rotation of the demi-discs (110). An actuator is associated with each disc assembly (104, 104') for bringing the disc assemblies (104, 104') into and out of contact with the product profile (120). A method is also provided for assembling tire components for the manufacture of tires.

16 Claims, 9 Drawing Sheets

(58) Field of Classification Search
CPC .... B29D 2030/3257; B29D 2030/3064; B29D 2030/2685; Y10T 156/1028; B29C 70/388; B29C 70/384
USPC .............................. 156/394.1, 408, 402, 421
See application file for complete search history.

PRESSURE BONDING PRODUCTS IN THE MANUFACTURE OF TIRES

TECHNICAL FIELD

The invention relates generally to tire production and more particularly to solutions for joining layers in the production of a wide variety of tire sizes and types.

BACKGROUND

Tires are commonly constructed from multiple layers and components that are placed sequentially onto an expandable and contractable building drum. The circumferentially rotating drum is typically a cylindrical shape having a flat profile along the axial direction, although it may include recesses for accepting features such as circular beads. In some known techniques, a layer of air-impermeable rubber is laid onto a forming surface of a drum, and one or more carcass plies are placed thereon. Each ply extends between the bead portions on opposing sides of the tire, through the opposing sidewall portions, and across the crown portion of the tire. A pair of circular beads is placed on opposing drum sides and may include bead wires and bead fillers. The plies are turned up and the beads are moved towards each other to create a toroidal shape.

In the art of tire production, disc rollers (also known as stitching discs) are used to create a good adhesion between different product layers. The task of rolling a disc (also known as "rouletage") ensures a setting seal by eliminating air bubbles that are caught between product layers. With these discs, pressure must be evenly applied across the drum forming surface without distorting the tire components.

Figure 1:
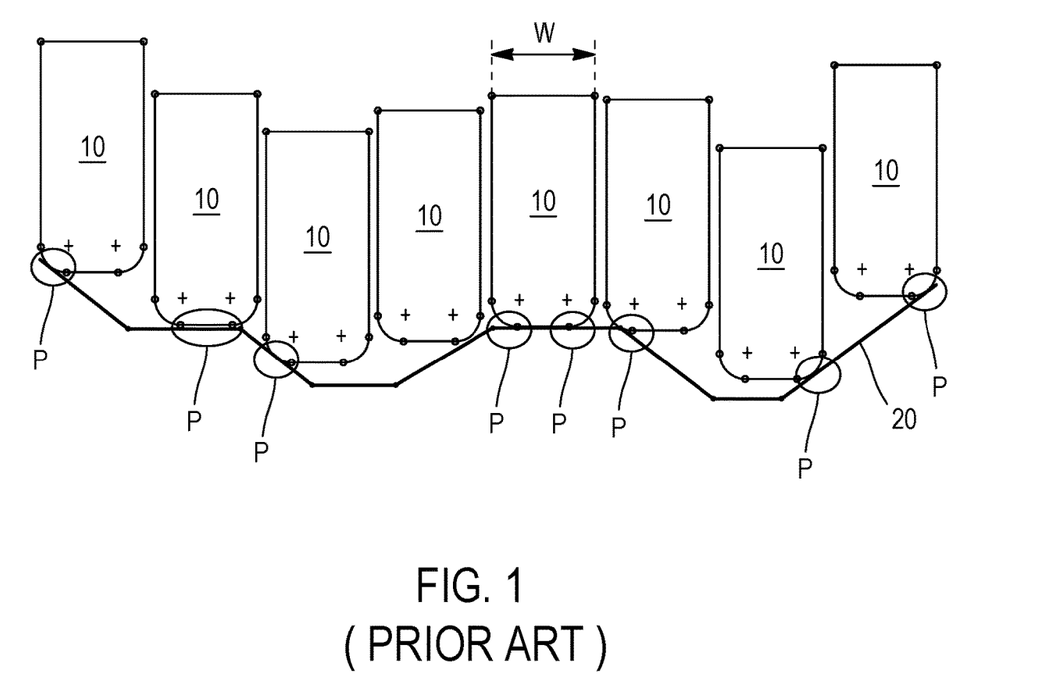
FIG. 1 shows a schematic view of a disc roller of the prior art in contact with a product profile.

FIG. 1 shows a disc roller of the prior art in which a plurality of discs 10 are arranged along a common axis and in contact with a profiled product 20 (as used herein, "product" can refer to one more reinforcement plies and other products used in tire production). Each disc 10 has a predetermined width W, and the distance between each disc 10 is fixed in order to distribute pressure along product 20 in a homogeneous manner. Discs 10 are actuated (e.g., by pneumatic, electronic, mechanical or equivalent actuation means as is known in the art) between the common axis and one or more points of contact P with product 20. In the case of such a profiled product, the contact point P between each disc 10 and product 20 is generally limited to an edge of the disc against a product slope. This is attributable to movement of the entire width W by the actuation means and restriction on disc placement by the means of fixation.

Because multiple product layers often create a profile that is no longer flat along the axial direction of the drum, the disks must accommodate different tire sizes and configurations. For more pronounced profiles, the discs are set further apart and the landing force realized is different at each contact point. Optimal productivity is therefore demanded while preserving the availability of diverse tire properties.

SUMMARY

A tire production device is provided for pressure bonding products that are presented in a product profile on a forming drum surface. The tire production device includes a multidisc roller system having a frame relative to which a plurality of disc assemblies is disposed along a common axis. The multidisc roller system also includes an actuator associated with each disc assembly for bringing the disc assemblies into and out of contact with the product profile.

Each disc assembly includes an actuatable arm that is linearly displaceable relative to the frame. The arm has a body of predetermined length coextensive with an actuating extent disposed proximate an actuator and an opposed free extent. The body has a top edge, a bottom edge and a guide member depending from the free extent and having a support platform that, together with a depending platform, delineates a guide groove. The disc assembly also includes a pair of removably attached demi-discs with each demi-disc being a generally annular element having a predetermined diameter. Each demi-disc has a substantially planar outer surface and an opposed inner surface with a grooved space defined between the opposed inner surfaces that rotatably engages the guide member. A flange depends inwardly along a periphery of each demi-disc and an inner flange surface thereof engages a support platform. The disc assembly further includes a bearing disposed proximate a bearing surface of the guide member that accommodates rotation of the demi-discs in the guide groove. The disc assemblies are aligned in a ready position along the common axis and all of the demi-discs have constant pitch prior to engagement with the product profile. The outer surfaces of adjacent demi-discs are in slidable alignment relative to each other and relative to the frame.

In some embodiments of the invention, at least one of the top edge and the bottom edge of the actuatable arm includes a guide rail for engagement with a corresponding path provided in the frame.

In some embodiments of the invention, in a pair of demi-discs, at least one demi-disc includes an aperture for accommodating a threaded fastener and a corresponding demi-disc includes a corresponding threaded aperture to effect removable attachment of the demi-discs in pairs.

In some embodiments of the invention, a disc assembly includes a rolling assembly having a bearing that accommodates rotation of a wheel. The rolling assembly is disposed intermediate a pair of demi-discs.

In some embodiments of the invention, one or more disc assemblies are provided in a kit for use with multiple forming drum surfaces. The kit includes multiple actuating arms and multiple demi-discs such that a selected disc assembly may be interchangeable with a non-selected disc assembly upon a change in the selected product profile. The product profile may include an undulating profile having slopes between alternating recesses and platforms.

A method of assembling tire components for the manufacture of tires is also provided. The method includes laying one or more air impermeable layers onto a forming drum surface of a rotatable forming drum having axial and circumferential directions and with the forming drum surface being coextensive with a pair of opposed sides. The method also includes providing at least one tire production device (as disclosed herein) for pressure bonding products that are presented in a product profile on the forming drum surface.

A tire building assembly is also provided that includes a tire production device as disclosed herein.

Other aspects of the presently disclosed invention will become readily apparent from the following detailed description.

BRIEF DESCRIPTION OF THE DRAWINGS

The nature and various advantages of the presently disclosed invention will become more apparent upon consideration of the following detailed description, taken in conjunction with the accompanying drawings, in which like reference characters refer to like parts throughout, and in which.

DETAILED DESCRIPTION

Reference now will be made in detail to embodiments of the presently disclosed invention, one or more examples of which are illustrated in the drawings. Each example is provided by way of explanation and not by limitation. It will be apparent to those skilled in the art that various modifications and variations can be made in the present invention without departing from the scope or spirit thereof. For instance, features illustrated or described as part of one embodiment can be used with one or more other embodiments to yield at least one further embodiment. Thus, it is intended that the present invention covers such modifications and variations as come within the scope of the appended claims and their equivalents.

Figure 2:
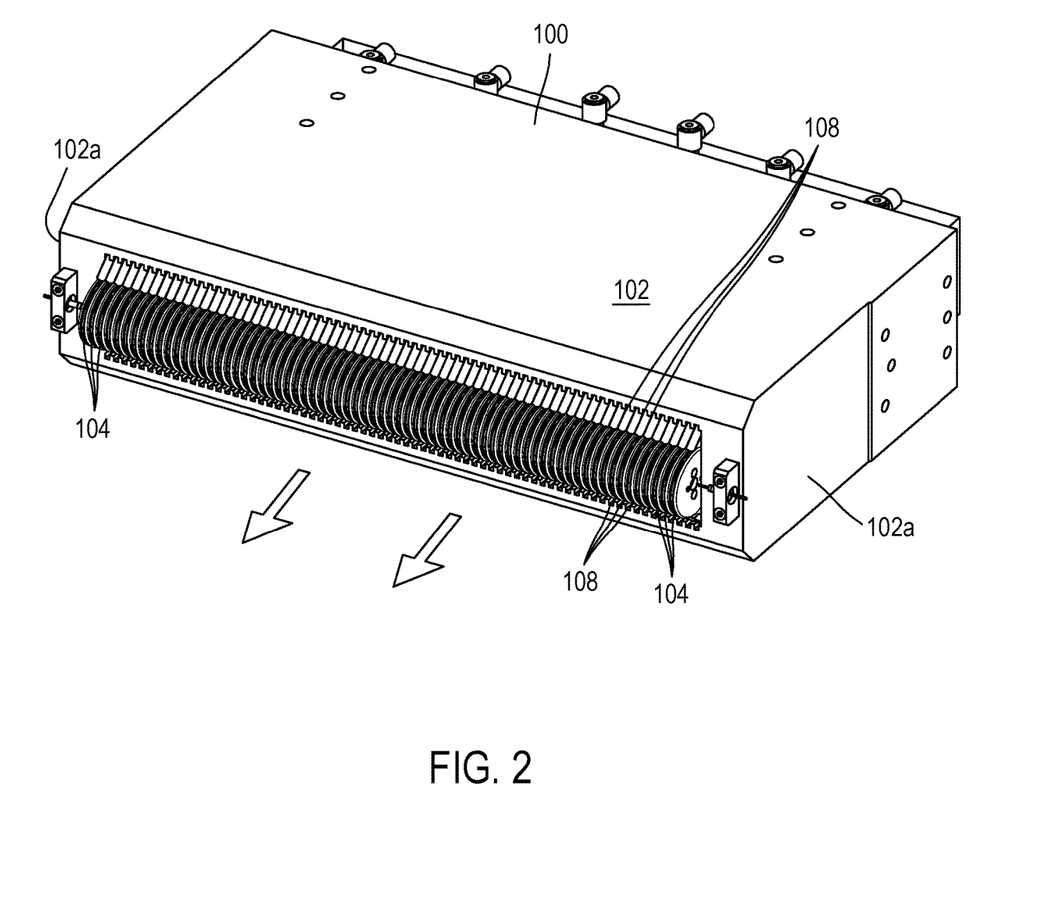
FIG. 2 shows a perspective view of an exemplary multi-disc roller system.
Figure 3:
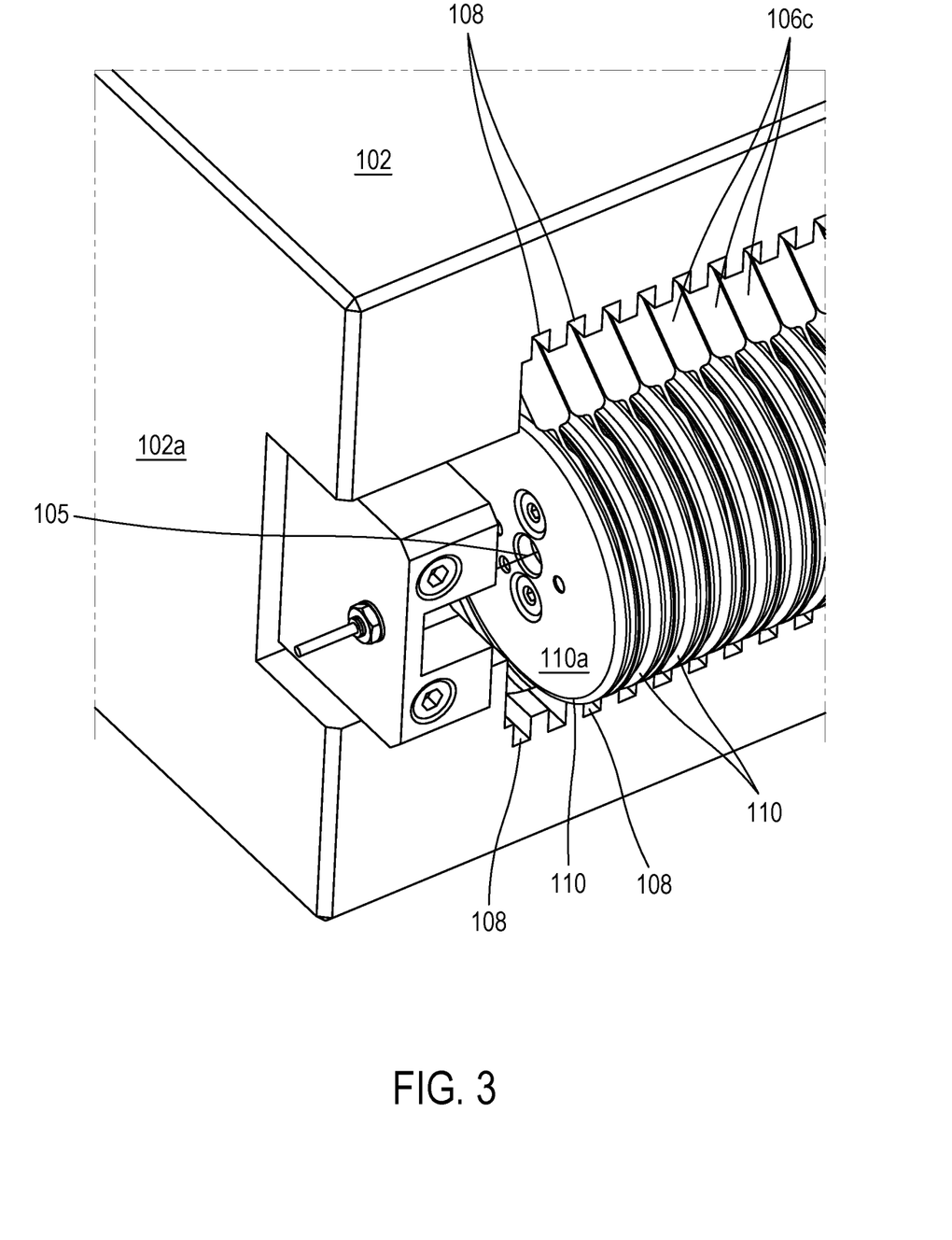
FIG. 3 shows a partial front perspective view of the multidisc roller system of FIG. 1.
Figure 4:
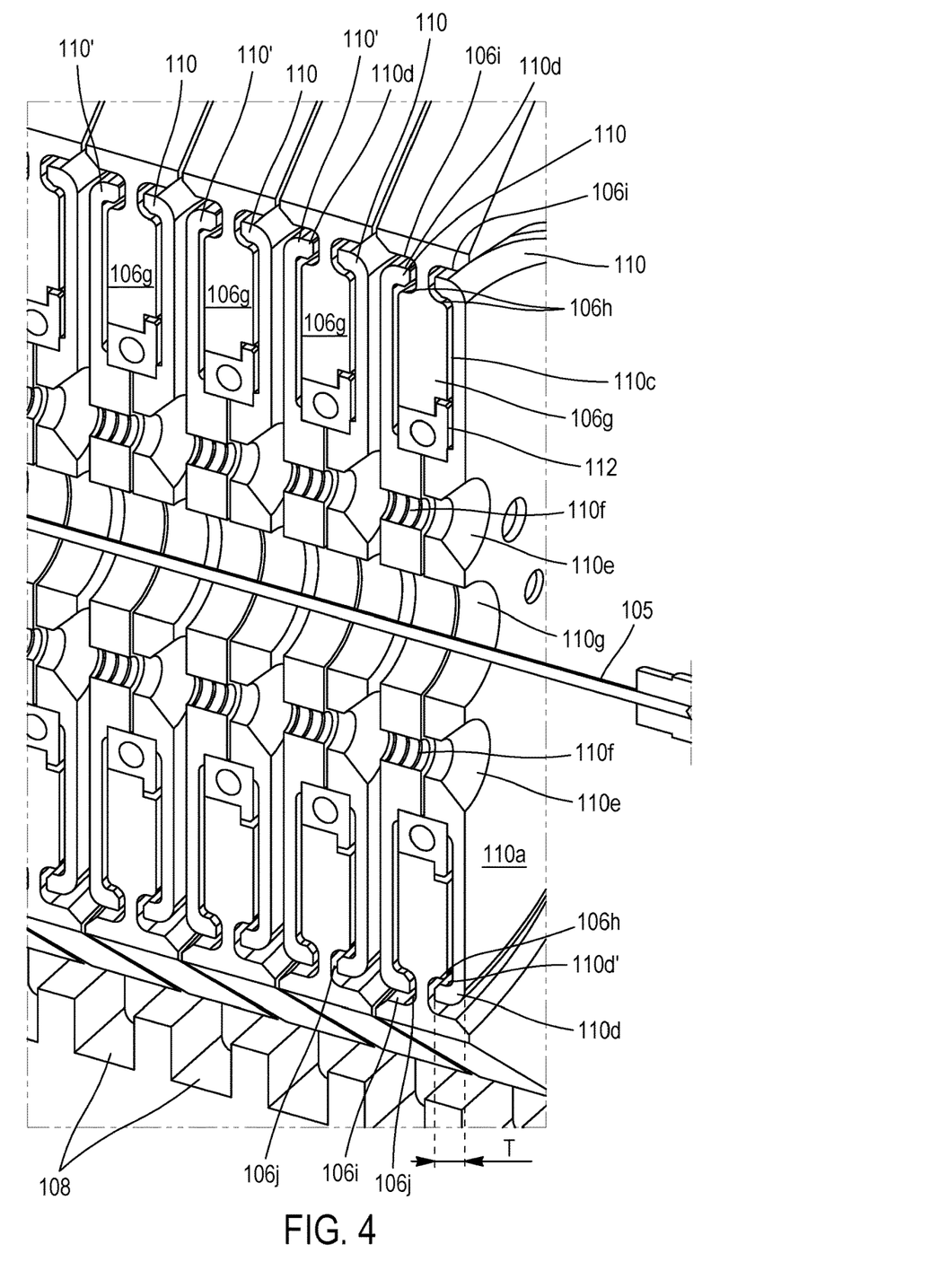
FIG. 4 shows a partial sectional view of the multidisc roller system of FIG. 1.

Now referring further to the figures, in which like numbers identify like elements, an exemplary roller system 100 of multidisc type is shown in FIG. 2 having a frame 102. Frame 102 supports a plurality of disc assemblies 104 that are reciprocatingly mobile relative to one another. Roller system 100 may comprise part of a ply positioning and posing system as is known in the art for production of a variety of tire configurations having variable performance properties. As used herein, the term "tires" includes but is not limited to tires used with lightweight vehicles, passenger vehicles, utility vehicles (including heavy trucks), leisure vehicles (including but not limited to bicycles, motorcycles, ATVs, etc.), agricultural vehicles, military vehicles, industrial vehicles, mining vehicles and engineering machines.

Still referring to FIG. 2 and referring additionally to FIGS. 3 to 6, disc assemblies 104 are consecutively disposed along a common axis that is defined relative to outermost end faces 102a of frame 102. An optional guide 105 may be provided along the common axis that ensures alignment of the disc assemblies in a ready position prior to engagement with a product profile.

Figure 5:
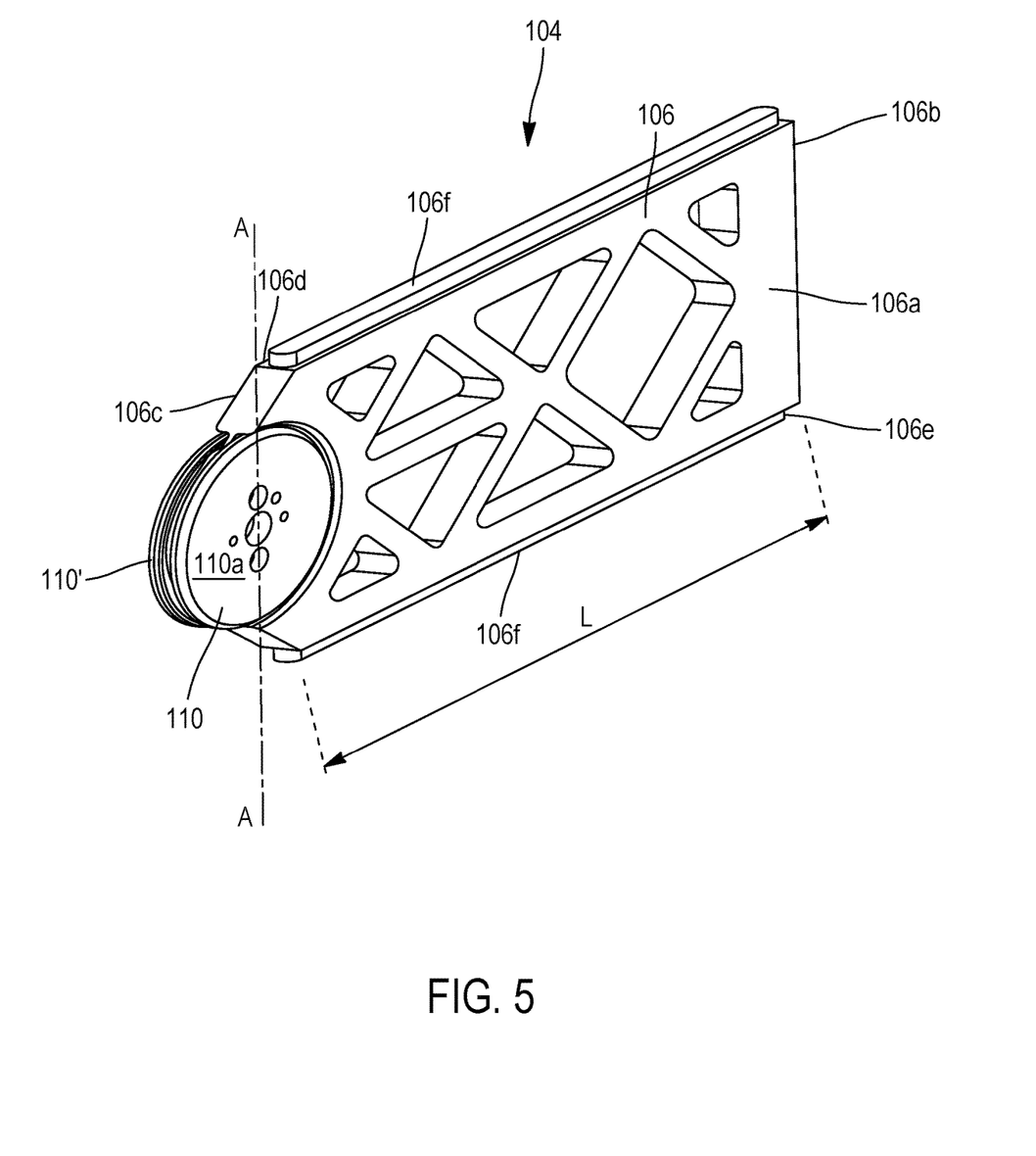
FIG. 5 shows a front perspective view of an exemplary disc assembly used with the multidisc roller system of FIGS. 2 to 4.
Figure 6:
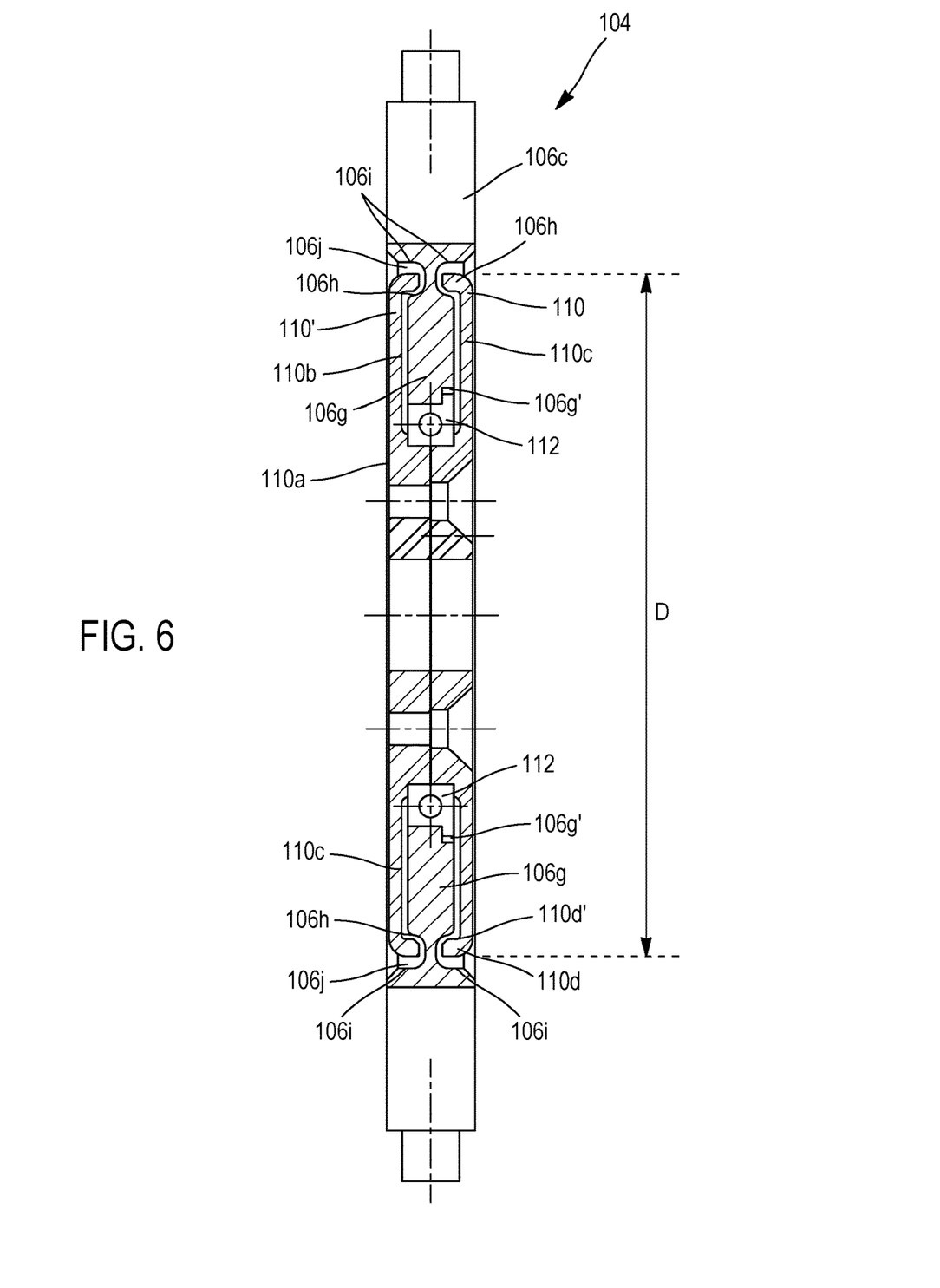
FIG. 6 shows a cross-sectional view of the disc assembly of FIG. 5 along line A-A.

As particularly shown in FIG. 5, each disc assembly 104 includes an actuatable arm 106 that is linearly displaceable relative to frame 102 (e.g., see the arrows of FIG. 2) in order to come into and out of contact with a ply product (or "ply") placed upon a forming drum surface (the terms "forming drum", "drum," "assembly drum" and "tambour" may be used interchangeably to refer to a circumferentially rotating element having a surface for receipt of one or more tire components during tire manufacture). Actuation of arm 106 may be effected by a piston-cylinder unit or other known actuator (not shown). Disc assemblies 104 are aligned and arranged consecutively so as to substantially cover an entire width of the ply on the forming drum surface.

Each actuating arm 106 has a body 106a of predetermined length L coextensive with an actuating extent 106b disposed proximate the actuating means and an opposed free extent 106c. Each of a top edge 106d and a bottom edge 106e includes a guide rail 106f for engagement with a corresponding path 108 provided in frame 102. It is understood that equivalent guidance structure may B9e utilized that is amenable with practice of the invention.

Each disc assembly 104 also includes a pair of removably attached demi-discs 110 that are supported by actuating arm 106 proximate free extent 106c thereof. Support is effected by a guide member 106g having support platforms 106h upon which each demi-disc is disposed. Support platforms 106h, together with corresponding depending platforms 106i, delineate a guide groove 106j that accommodates rotation of demi-discs 110. Each pair of demi-discs 110 is journaled for rotation by means of a bearing 112 that is disposed proximate a bearing surface 106g' of guide member 106g.

Each demi-disc 110 is a generally annular element having a predetermined diameter D. Each demi-disc 110 has substantially planar outer surface 110a and an opposed inner surface 110b. Inner surface 110b includes a grooved space 110c that engages guide member 106g. A flange 110d depends inwardly along a periphery of each demi-disc 110 and an inner flange surface 110d' thereof engages support platform 106h. Each demi-disc 110 may have a predetermined thickness T which is modifiable in correspondence with the selected tire product and its commensurate profile during production.

At least one demi-disc 110 includes an optional aperture 110e for accommodation of an attachment means such as threaded fastener. When such a fastener is employed, a corresponding demi-disc 110' includes a corresponding threaded aperture 110f such that the discs are easily assembled and disassembled in pairs. Although corresponding screws and threads are shown, it is understood that comparable means for removable attachment may be employed (including those that obviate apertures 110e and 110f). Such removable attachment permits modification of disc assembly 104 in accordance with the selected product profile. For example, an actuatable arm 106 having a selected length L may be exchanged for an actuatable arm having a different length. Also, a pair of demi-discs 110 having a selected diameter D may be exchanged for a pair of demi-discs having a different diameter. Pairs of demi-discs 110 may be added or subtracted as needed to ensure uniformity of pressure over the selected product profile.

Each demi-disc 110 may include a central aperture 110g having a center that is brought into alignment with the central axis when roller system 100 is in the ready position. Disc assemblies 104 are disposed along the common axis such that outer surfaces 110a of adjacent demi-discs 110 are in slidable alignment relative to each other and relative to frame 102. By providing a plurality of demi-discs having a common axis and constant pitch, pressure is simultaneously applied over an entire periphery of the plies, including profiled portions along which the bond becomes substantially uniform and air is firmly exhausted.

Figure 7A:
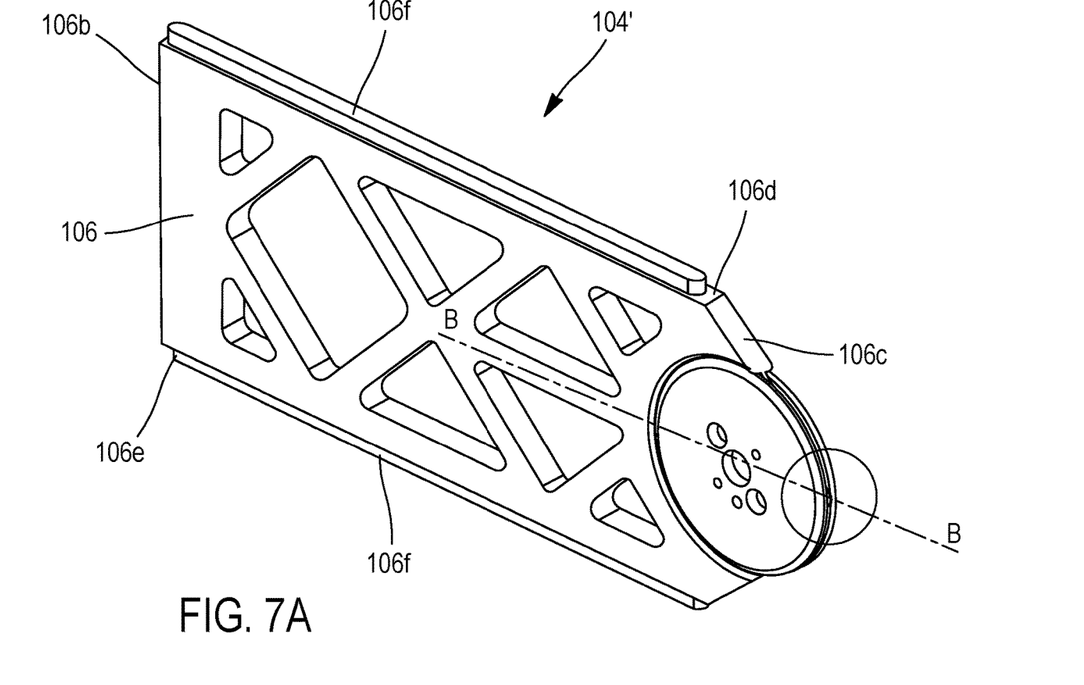
FIG. 7A shows a front perspective view of another exemplary disc assembly used with the multidisc roller system of FIGS. 2 to 4.
Figure 7B:
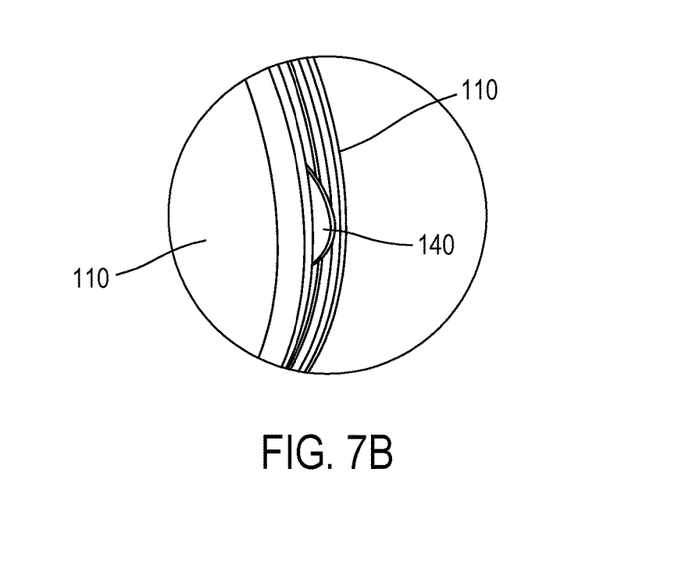
FIG. 7B shows the circled portion thereof.
Figure 8:
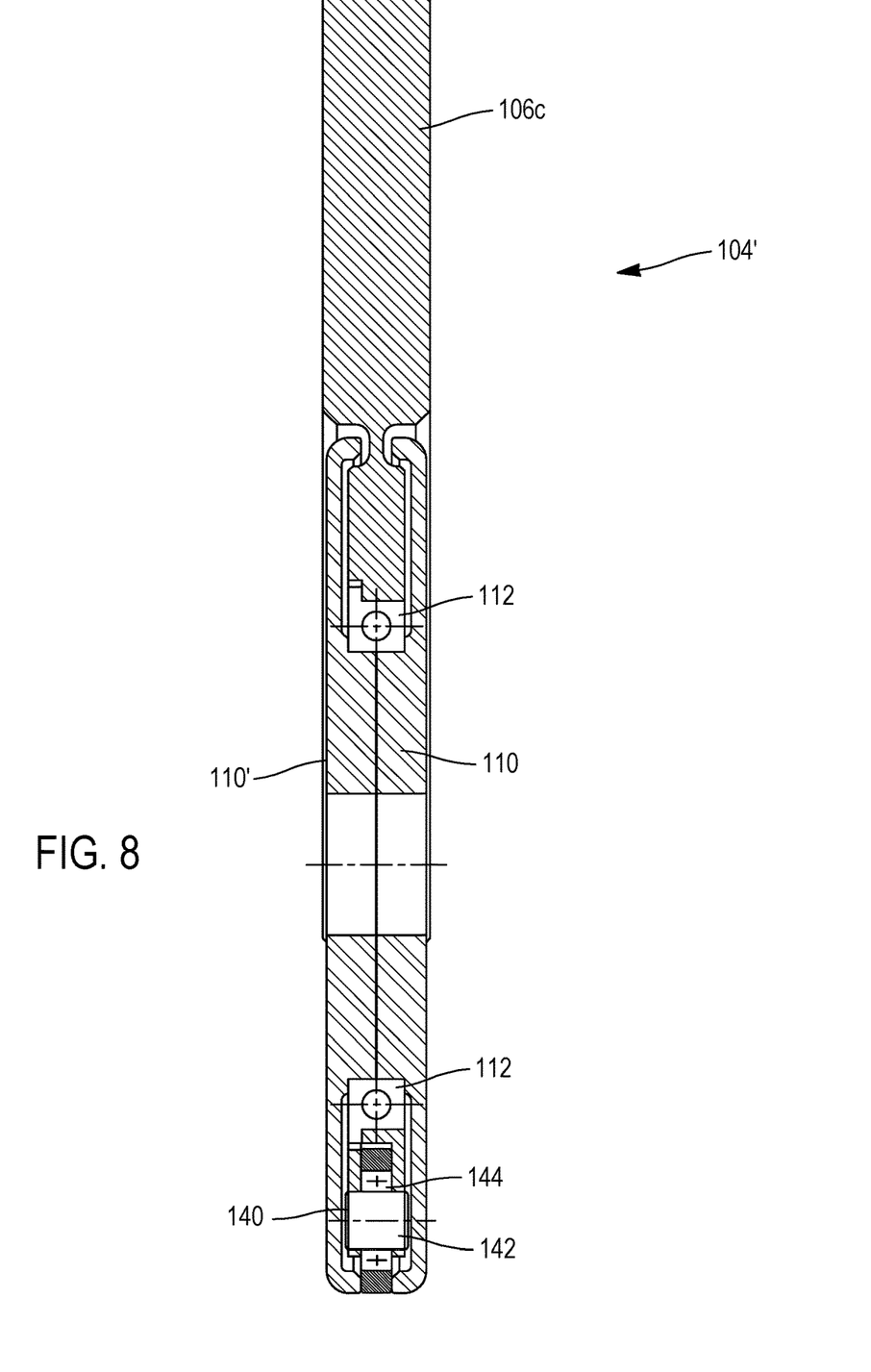
FIG. 8 shows a cross-sectional view of the disc assembly of FIG. 7A along line B-B.

Referring further to FIGS. 7A, 7B and 8, disc assembly 104' may also be employed with roller system 100. Disc assembly 104' includes all of the elements of disc assembly 104 except that a rolling assembly 140 is disposed intermediate a pair of demi-discs 110. Rolling assembly 140 includes a wheel 142 that is journaled for rotation by means of a bearing 144. Rolling assembly remains rotatable relative to demi-discs 110 so as avoid any grooving effect in the product profile.

Disc assemblies 104, 104' are generally fabricated from commercially available hardware and simple machined parts, therefore providing a readily available lightweight complement to existing roller systems. For example, each actuating arm 106 and each demi-disc 110 may be fabricated from materials including but not limited to aluminum, stainless steel, metal, composite and any comparable and/or equivalent material. Disc assemblies 104, 104' are easily assembled from commercially available parts and/or parts that are readily machined with minimal temporal and fiscal investment (e.g., such as by rapid prototyping). Demi-discs 110 can be made of material having a low-friction sliding surface to accommodate rotation and linear displacement.

In operation, roller system 100 commences stitching from the ready position, in which demi-discs 110 have already been selected for desired diameter and quantity. During a tire production cycle, roller system 100 actuates disc assemblies 104 in order to contact a product that is placed on a rotatable forming drum and generally centered between opposed sides thereof. The drum has a cylindrically-shaped forming surface that is substantially flat along an axial direction and curved along a circumferential direction. The rotation of the drum advances the ply to a pressing position. Where multiple reinforcing plies and/or other reinforcing features are used, such plies and features do not require simultaneous application over the drum forming surface. Thus, multiple product profiles may be realized in multiple product laying sequences. The invention addresses these profile variances while preserving precise bonding of ply products during tire production.

Figure 9:
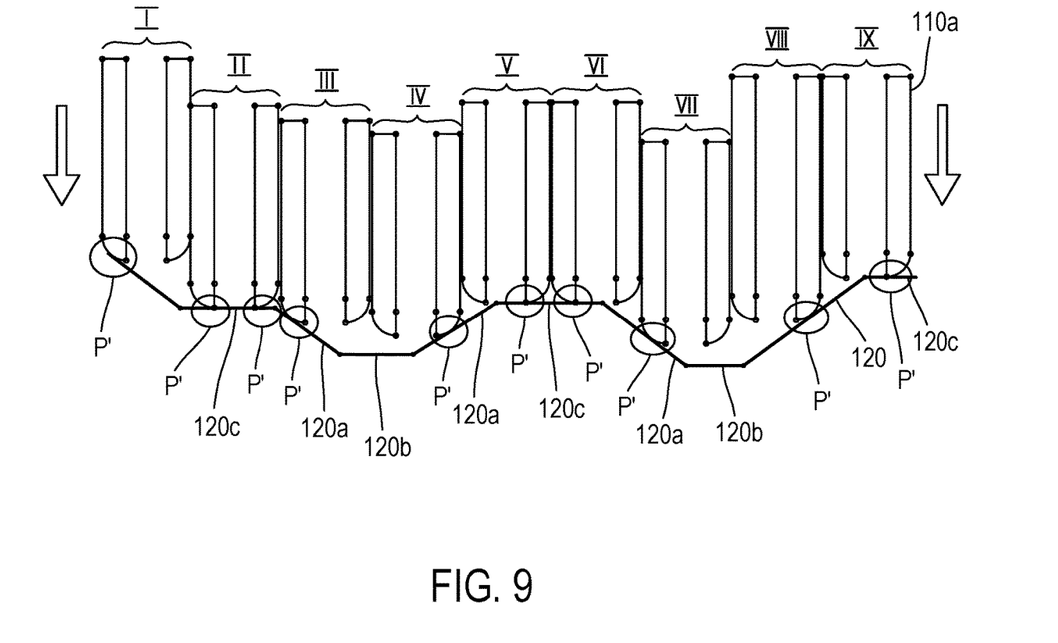
FIG. 9 shows a schematic view of the multidisc roller system of FIGS. 1 to 4 in contact with a product profile.

For ease of reference, in FIG. 9, pairs of demi-discs 110 are separately identified (see pairs I, II, III, IV, V, VI, VII, VIII and IX). For each pair, an outer surface 110a of each demi-disc 110 is in sliding proximity relative to an outer demi-disc surface 110a of an adjacent pair (with the exception of outer surfaces 110a disposed proximate outermost end faces 102a of frame 102, see FIG. 2). Thus, for example, for pair II, one outer surface 110a is disposed adjacent an outer surface 110a of pair I. The other outer surface of pair II is disposed adjacent an outer surface 110a of pair III. Demi-discs 110 therefore remain reciprocatably movable relative to one another in accordance with actuation of corresponding actuating arms 106.

It is understood that adjacent outer disc surfaces 110a need not be in contact with one another and that a predetermined space may be provided intermediate adjacent pairs. Spaces may be provided between each pair of demi-discs or between intermittent pairs in association with the product profile. Such modularity in spacing, while retaining the beneficial properties of relative movement, optimizes the distribution of pressure along the extent of the product profile regardless of the profile's homogeneity or lack thereof.

As further shown in FIG. 7, a product 120 that is placed on the drum forming surface (not shown) has a profile similar to that of profiled product 20 as shown and described herein with respect to FIG. 1. Product 120 includes an undulating profile having slopes 120a between alternating recesses 120b and platforms 120c.

Upon presentation of product 120 on the drum forming surface, roller system 100 actuates each disc assembly 106 from the ready position to a pressing position (i.e., in the directions of the arrows in each of FIGS. 2 and 7) in which demi-discs 110 apply pressure at one or more points of contact P' with product 120. Each arm 106 is linearly reciprocatable between the common axis and the points of contact P'. Thus, movement of demi-discs 110 may be controlled among predetermined positions throughout a tire-building cycle. Relative displacement of adjacent pairs of demi-discs can be effected, or controlled as a whole, in sections or individually relative to one another by one or more actuators. In this manner, the application of pressing force along product 120 is expanded beyond the vicinity between an edge of the demi-disc against product slope 120a. Both the quantity of contact points P' and the quality of pressure between demi-discs 110 and product 120 ensure uniformity of production for all cross-sectional profiles.

It is understood that demi-discs 110 exert a pressing force on unvulcanized rubber. If this force is exerted at an angle to the ply surface, a force component is generated in the circumferential direction that displaces the ply laterally. Thus, the efficacy of the invention to apply sufficient pressure at contact points P' ensures pressure at right angles so as to conform to the surface shape. The resulting orientation of the reinforcing cords in the target position prevents separation of components in the finished tire.

Demi-discs 110 accommodate varying product thicknesses. Modifications in product thickness are dimension specific and therefor incur temporal and fiscal costs, particularly in those processes that employ multiple drums. The invention sustains ready production of multiple tire varieties by existing forming drum systems without compromising the performance benefits thereof and without significant capital expenditures.

Although operation of roller system 100 is described with reference to disc assembly 104, it is understood that the roller system 100 may utilize disc assembly 104' in a commensurate manner. One or more disc assemblies 104, 104' may be provided, for example, in a kit having multiple actuating arms 106 (including those of varying lengths) and multiple demi-discs 110 (including those of varying diameters) for use with multiple forming drum surfaces. For such kits, a selected disc assembly may be interchangeable with a non-selected disc assembly upon a change in the selected product profile.

Roller system 100 may be included in a work station that is one of several work stations in a tire production facility. Thus, tire production may take place through an automated and continuous process in which deposition and bonding of the products is effected within a minimal cycle time. One or more profile contours may be preprogrammed (for example, as by one or more programmable logic controllers, or PLCs) such that a single production session can accommodate identical contours multiple times and/or varying contours in succession. One or more controllers or control systems (collectively "controllers") may determine the instructions to drive the various components of roller system 100 (e.g., measured values and correction algorithms). Such controllers may also synchronize roller system 100 as determined by circumferential movement of the drum (e.g., to bring the roller system between the ready position and the pressing position). These controllers may communicate with one or more sensors and one or more timers as is known in the art.

One or more networked devices may be implemented with roller system 100, e.g., in a cluster or other distributed computing system. Accompanying interactive software applications may be downloaded on a desktop or uploaded from a remote site onto a mobile device. Instructions for use of the software applications may also be included along with resources for accessing any remote platforms that provide one or more users with an interface for collaboration with others. It is contemplated that a mobile device may be employed that has the software applications pre-loaded for ready use.

The dimensions and values disclosed herein are not limited to a specified unit of measurement. For example, dimensions expressed in metric units are understood to include equivalent dimensions in English and other units (e.g., a dimension disclosed as "1 inch" is intended to mean an equivalent dimension of "2.5 cm").

While particular embodiments of the disclosed apparatus have been illustrated and described, it will be understood that various changes, additions and modifications can be made without departing from the spirit and scope of the present disclosure. Accordingly, no limitation should be imposed on the scope of the presently disclosed invention, except as set forth in the accompanying claims.

What is claimed is:

1. A tire production device for pressure bonding products that are presented in a product profile on a forming drum surface, the tire production device comprising:
    a multidisc roller system having a frame relative to which a plurality of disc assemblies is disposed along a common axis; and
    an actuator associated with each disc assembly for bringing the disc assemblies into and out of contact with the product profile,
    wherein each disc assembly comprises:
        an actuatable arm that is linearly displaceable relative to the frame, with the arm having a body of predetermined length coextensive with an actuating extent disposed proximate an actuator and an opposed free extent, with the body having a top edge and a bottom edge, and with a guide member depending from the free extent and having a support platform that, together with a depending platform, delineates a guide groove;
        a pair of removably attached demi-discs, with each demi-disc being a generally annular element having a predetermined diameter and with each demi-disc having a substantially planar outer surface and an opposed inner surface with a grooved space defined between the opposed inner surfaces that rotatably engages the guide member, wherein a flange depends inwardly along a periphery of each demi-disc and an inner flange surface thereof engages the support platform; and
        a bearing disposed proximate a bearing surface of the guide member that accommodates rotation of the demi-discs in the guide groove, and
    wherein the disc assemblies are aligned in a ready position along the common axis and all of the demi-discs have constant pitch prior to engagement with the product profile such that outer surfaces of adjacent demi-discs are in slidable alignment relative to each other and relative to the frame.

2. The tire production device of claim 1, wherein at least one of the top edge and the bottom edge of the actuatable arm includes a guide rail for engagement with a corresponding path provided in the frame.

3. The tire production device of claim 1, wherein, in a pair of demi-discs, at least one demi-disc includes an aperture for accommodating a threaded fastener and a corresponding demi-disc includes a corresponding threaded aperture to effect removable attachment of the demi-discs in pairs.

4. The tire production device of claim 1, wherein each demi-disc includes a central aperture having a center that is brought into alignment with the common axis when the multidisc roller system is in the ready position.

5. The tire production device of claim 1, wherein, in the ready position, the disc assemblies are aligned and arranged consecutively so as to substantially cover an entire width of the product on the forming drum surface.

6. The tire production device of claim 1, wherein each demi-disc has a predetermined thickness that is modifiable in correspondence with the product profile.

7. The tire production device of claim 1, wherein a disc assembly includes a rolling assembly having a bearing that accommodates rotation of a wheel with the rolling assembly being disposed intermediate a pair of demi-discs.

8. The tire production device of claim 1, wherein one or more disc assemblies are provided in a kit for use with multiple forming drum surfaces, with the kit including multiple actuating arms and multiple demi-discs such that a selected disc assembly may be interchangeable with a non-selected disc assembly upon a change in the selected product profile.

9. The tire production device of claim 1, wherein the product profile includes an undulating profile having slopes between alternating recesses and platforms.

10. A method of assembling tire components for the manufacture of tires comprising:
    laying one or more air impermeable layers onto a forming drum surface of a rotatable forming drum having axial and circumferential directions and with the forming drum surface being coextensive with a pair of opposed sides; and
    providing at least one tire production device according to claim 1 for pressure bonding products that are presented in the product profile on the forming drum surface.

11. The method of claim 10 further comprising:
    providing the tire production device in the ready position, wherein providing the tire production device in the ready position includes at least one of:
        aligning and arranging the adjacent pairs of demi-discs consecutively so as to substantially cover an entire width of the product profile on the forming drum surface; and
        selecting pairs of demi-discs having at least one of a predetermined quantity, a pre-determined diameter and a pre-determined thickness commensurate with the product profile.

12. The method of claim 11 further comprising, upon presentation of the product profile:
    bringing the disc assemblies to a pressing position, in which at least one disc assembly is brought into contact with the product profile and applies pressure at one or more points of contact with the product profile, with each arm being linearly reciprocatable between the common axis and the points of contact,
    wherein the bringing of the disc assemblies to the pressing position includes relative displacement of adjacent pairs of demi-discs.

13. The method of claim 12, wherein at least one outer surface of each demi-disc is in sliding proximity relative to an outer demi-disc surface of an adjacent pair of demi-discs.

14. The method of claim 11 further comprising:
modifying at least one of a quantity of adjacent pairs of demi-discs and a predetermined spacing between adjacent pairs of demi-discs.

15. The method of claim 10 further comprising:
programming one or more profile shapes into at least one programmable controller in signal communication with the tire production device such that the pressing position is selectable from a plurality of profile shapes.

16. A tire building assembly comprising the tire production device of claim 1.

* * * * *